Jan. 6, 1942.    F. FISHER    2,268,581
POULTRY PLUCKING MACHINE
Filed Jan. 10, 1938    3 Sheets-Sheet 1

INVENTOR.
Foster Fisher
BY Barlow & Barlow
ATTORNEYS.

Jan. 6, 1942.  F. FISHER  2,268,581
POULTRY PLUCKING MACHINE
Filed Jan. 10, 1938  3 Sheets-Sheet 2
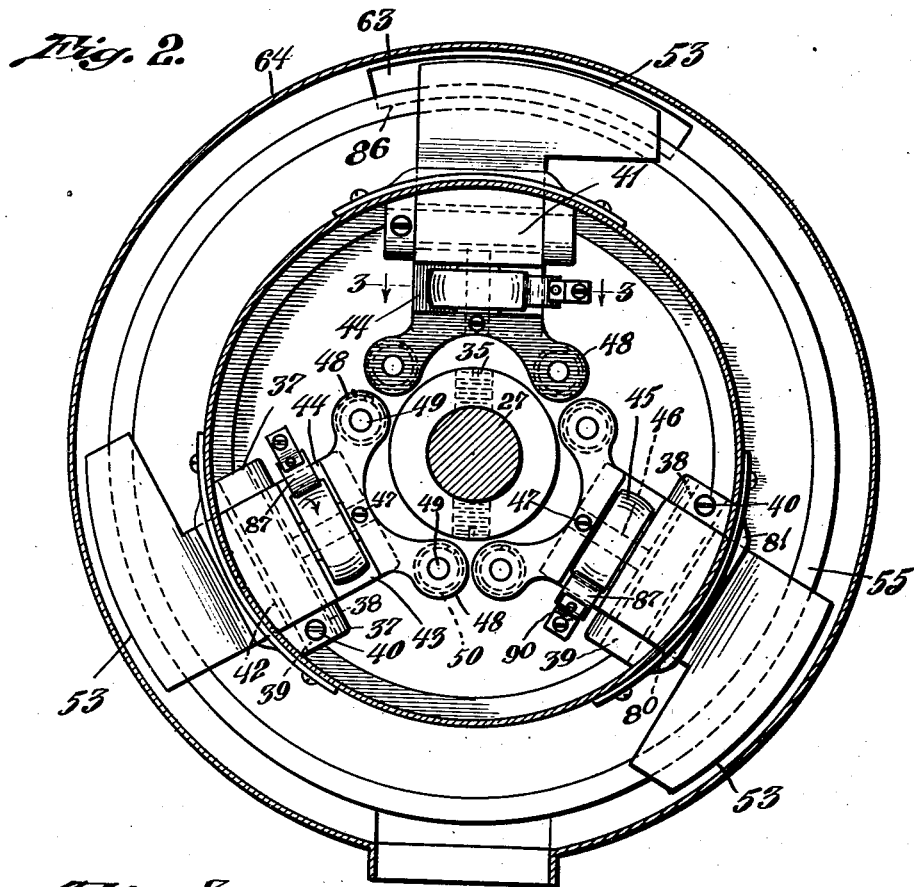
Fig. 2.
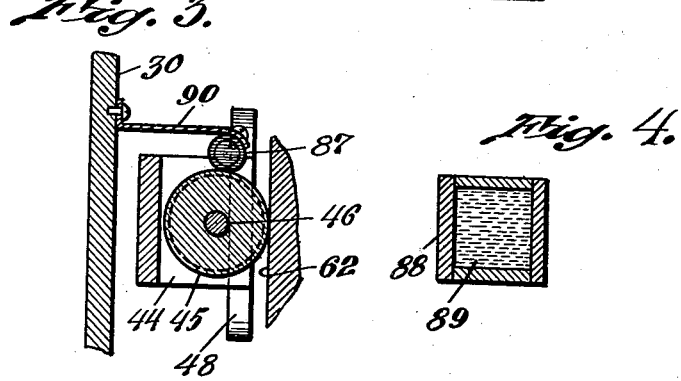
Fig. 3.
Fig. 4.
INVENTOR.
Foster Fisher
BY Barlow & Barlow
ATTORNEYS.

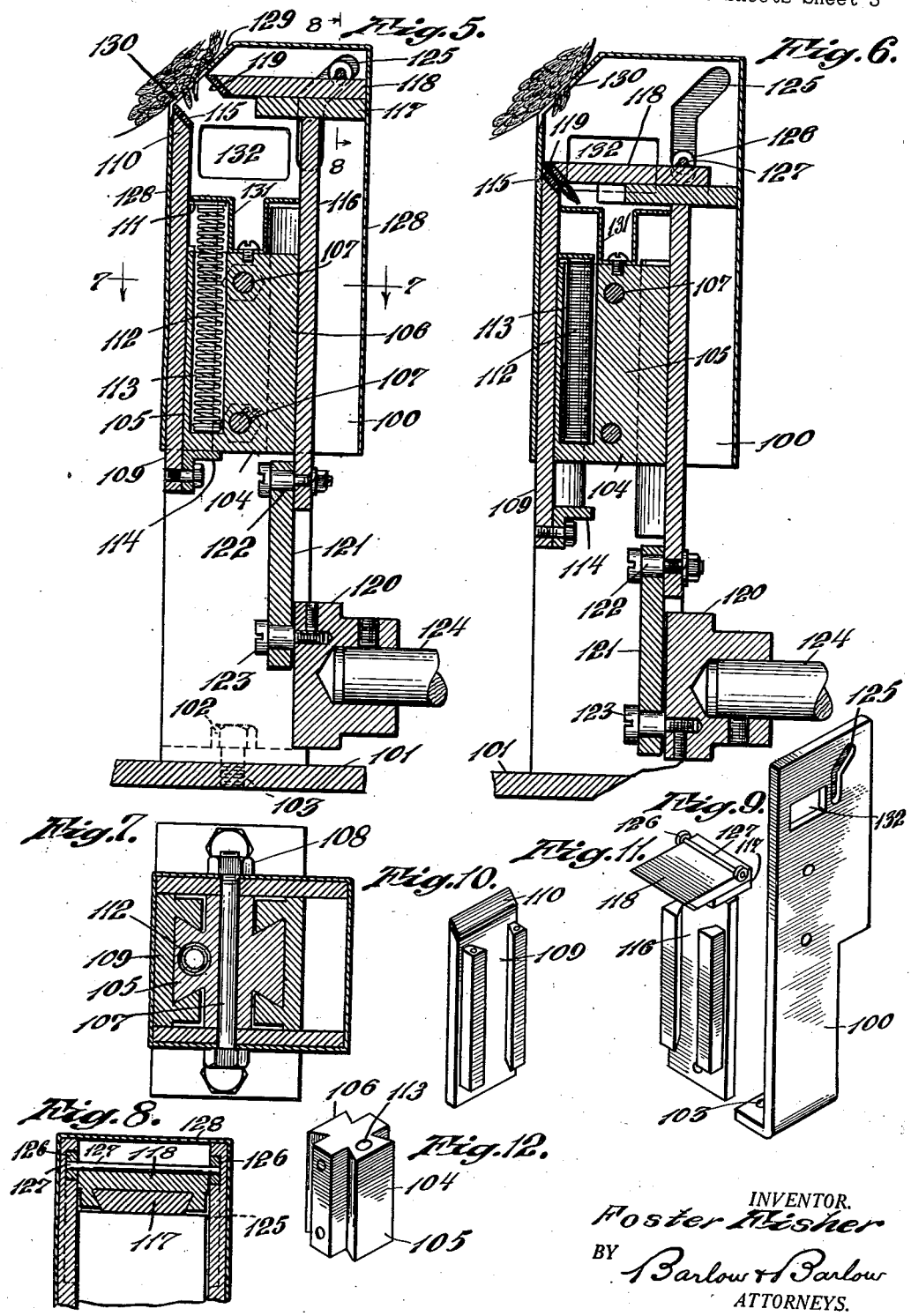

Patented Jan. 6, 1942

2,268,581

UNITED STATES PATENT OFFICE 2,268,581

POULTRY PLUCKING MACHINE

Foster Fisher, Providence, R. I., assignor to James M. Stockett, Providence, R. I.

Application January 10, 1938, Serial No. 184,181

14 Claims. (Cl. 17—11.1)

This invention relates to improvements in poultry plucking machines; and has for one of its objects to provide novel and improved means in a machine of this character for a more efficient removal of feathers from a fowl.

Another object of the invention is to provide a plucking machine having relatively few moving parts.

A further object of this invention is the provision in a plucking machine having feather gripping elements adaptable to various feather conditions.

It is a further object of this invention to provide gripping element surfaces having a relatively high degree of friction.

An additional object of the invention is to provide in a plucking machine lubricant to frictionally contacting parts which are not easily accessible.

With these and other objects in view the invention consists of certain novel features and combination of parts as will be hereinafter more fully described and claimed and illustrated in the accompanying drawings in which:

Fig. 2 is a cross-sectional view of the machine taken along a line corresponding to the line 22 of Fig. 1;

Fig. 3 is a fragmental sectional view of a detail of a lubricant device;

Fig. 4 is a central sectional view of a lubricant container;

Fig. 5 is a sectional elevational view of a modified form of plucking machine embodying my invention;

Fig. 6 is a view similar to that illustrated in Fig. 5 but showing the plucking elements of the machine in their lowermost position and with their gripping surfaces in feather gripping relation;

Fig. 7 is a sectional plan view of the modified machine taken along a line corresponding to line 7—7 of Fig. 5;

Fig. 8 is a side sectional view taken along a line corresponding to line 8—8 of Fig. 5 looking in the direction of the arrows;

Fig. 9 is a perspective view of one of the side supports of the machine;

Fig. 10 is a perspective view of one of the plucking elements of the modified machine;

Fig. 11 is a perspective view of an assembled portion of the modified machine; and Fig. 12 is a perspective view of the slide bearing block of the modified machine.

Figure 1:
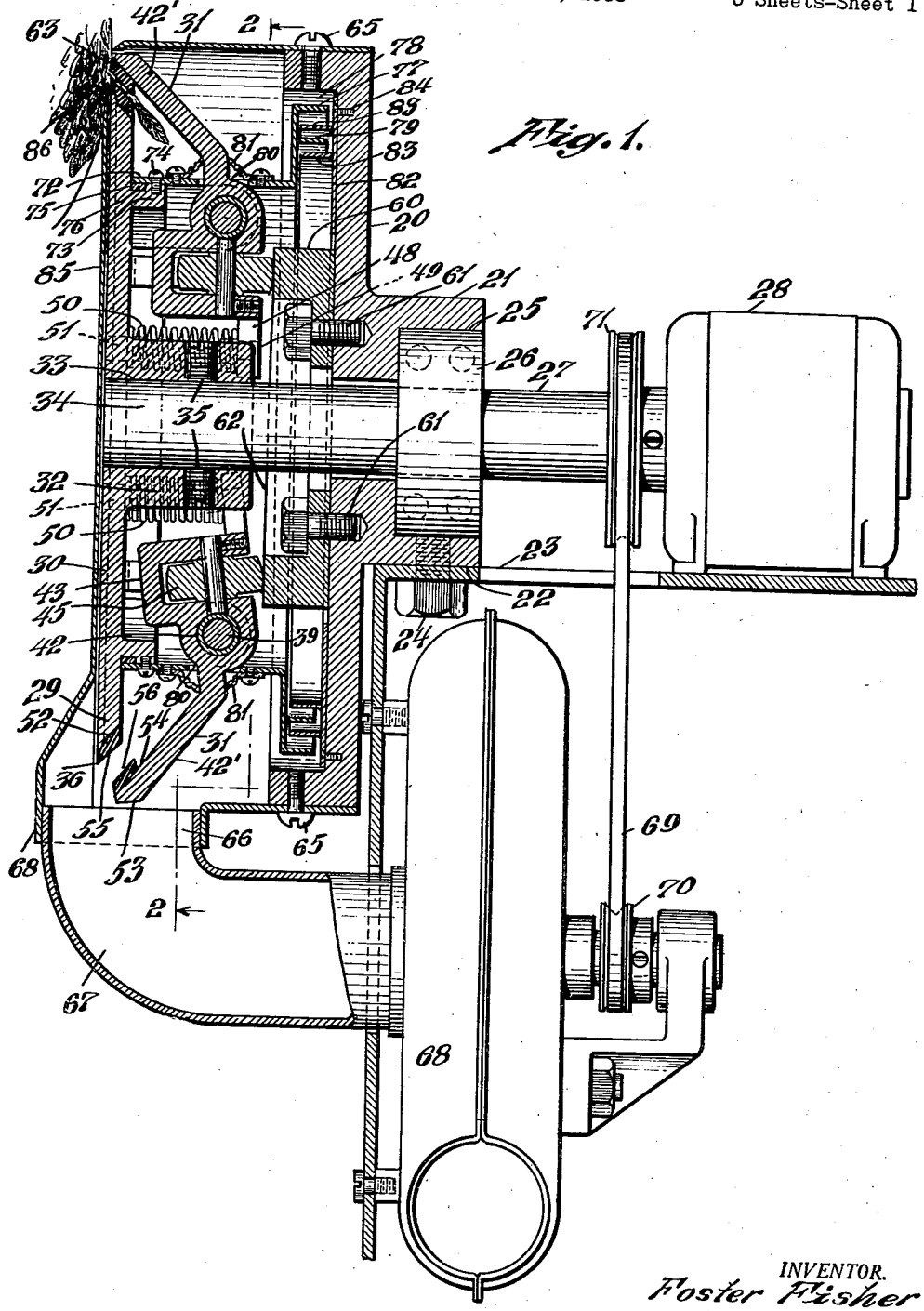
Fig. 1 is a side elevational view of my improved fowl plucking machine shown partly in section.

This invention consists in general of feather plucking members suitably mounted on proper supports and relatively movable by suitable mechanism to feather engaging position and thereafter movable to pull or pluck the gripped feathers from the skin of the fowl being dressed. In the preferred embodiment of the invention these plucking members comprise gripping elements or jaws having a suitable resilient gripping surface and movable relative to each other and in one form rotatable in unison about a common axis. Suction means are additionally employed for urging the feathers between the gripping surfaces of the plucking members and for removing the plucked feathers from the casing which envelopes the plucking members and associated parts.

Resilient means in the form of compression springs are employed for moving the gripping surfaces of the plucking members to feather engaging position, which springs will permit these gripping surfaces to adapt themselves to various feather conditions such as different thicknesses of feathers inherent in different poultry.

Referring to the drawings for a more detailed description of the invention, 20 designates the frame of the machine of any suitable construction but preferably substantially circular edgewise with a hub-like extension 21 having a flat lower surface 22 which rests and is supported upon the top edge part of a stand 23 and is securely fixed thereto by bolts 24. This hub-like portion 21 is provided with a circular aperture 25 for the reception of an anti-friction bearing member 26 in which a shaft 27 is journaled. This shaft 27 extends through and beyond the frame 20, where its outer end is suitably driven by an electric motor 28 supported in fixed position on the stand 23.

In the preferred plucking machine the outer portion of a circular plate 30 serves as one jaw 29 for a plurality of feather plucking elements or jaws 31 and has a hub 32 extending therefrom which is provided with an opening 33 to snugly fit the end 34 of the shaft 27 where it is secured by set screws 35 engaging suitable threaded openings in the hub 32. The peripheral edge of this plate is beveled inwardly to provide a knife edge 36 which permits the flesh of the fowl to be positioned sufficiently close to this jaw plucking element 29 to remove the short feathers.

Extending from the inner surface of this plate 30 and at equal distances from the center thereof are a plurality of equally angularly related pairs of spaced ears 37 which are provided with openings 38 for receiving the ends of pins 39 which are made fast in said opening 38 by set screws 40. Pivotally mounted between these pairs of ears 37 on the pins 39 are the jaws 31 which cooperate with the beveled edge 36 which forms jaw 29. These jaws 31 are provided with oilless bearings 42 for rocking on the pins 39.

Each jaw element 31 has an arm 42' extending outwardly and a portion 43 extending inwardly from the pivoting point and is provided with a slot 44 to receive an anti-friction member in the form of a roller 45, the purpose of which will be hereinafter described. A pin 46 extends into the slot 44 and is there secured by set screw 47 to rotatably mount roller 45. The inwardly extending portion 43 terminates in spaced abutments 48 having pins 49 which extend a short distance therefrom and are of a size to snugly fit the inner surface of the end convolutions of a compression spring 50, the other end of which abuts the inner surface of the plate 30 and is anchored thereto by encircling the pin 51 which extends from this plate. This spring urges the jaw elements 31 toward the plate 30 into feather engaging position and provides a means for varying the distance between the gripping surfaces to accommodate various thicknesses of feathers gripped as may exist on different fowls.

The arm portion 42' of the jaw element 31 is inclined towards and extends along the beveled surface 52 of the plate 30 and has a surface 54 at an angle to provide correspondingly shaped surfaces on the outer and inner elements of the plucking members.

I have found in practice that when the gripping surfaces of both plucking elements are of metal the sudden impact of the jaws frequently breaks the feathers at their point of entrance between these jaw elements 29 and 31, which greatly reduces the efficiency of the machine, and to avoid this occurrence I provide on these surfaces a covering of resilient material such as rubber which will provide feather engaging surfaces 55 and 56 which will give sufficiently to avoid breaking the quill of the feathers and also provided a surface having good friction qualities to hold the feathers therebetween. This resilient surface also obviates the noise otherwise incident to the periodic closing of the jaws together.

In order to return the plucking members to an open position and release the feathers held therebetween, a circular cam 60 having a central opening is mounted on the inner surface of the frame 20, and encircles the shaft 27 with ample clearance therebetween, and is secured in place by bolts 61 having engagement with threaded apertures in the wall of the frame 20. This cam is provided with a suitable continuous cam surface 62 against which the rollers 45 engage to determine their path of travel by reason of the springs 50 urging these rollers 45 into continuous engagement with this cam surface 62.

The cam surface 62 is so arranged that the plucking members will be fully opened when substantially at their lowermost position and to approach each other when in adjacency to an opening 63 in the upper portion of the casing 64, to be presently described.

The plucking members and their associated parts are enclosed in this casing 64 which is cylindrical in form and of a size to encompass the outer edge of the frame 20 and is secured thereto by screws 65 engaging suitable threaded apertures therein. A flanged opening 66 is provided in the lower portion of this casing for receiving a conduit 67 leading from an exhaust blower 68 suitably supported and secured on the stand 23 and being operatively connected with the electric motor 28 by an endless belt 69 trained over a pulley 70 secured on the fan shaft of the blower 68 and a pulley 71 secured adjacent to the motor on the shaft 27.

In order to keep certain parts of this plucking machine free of plucked feathers or foreign material, such as blood, fine feathers, etc., I provide an inner tubular casing 72 one end portion of which closely fits an annular rib 73 projecting from the inner surface of the plate 30 and secured thereto by screws 74. This rib is provided with an annular recess 75 adjacent the inner surface of the plate 30 for receiving packing 76 which is engaged by the inner surface of the tubular casing 72 to seal this connection. The opposite end portion 77 of this tubular casing 72 is enlarged in diameter and extends into an annular recess 78 provided in the wall of the frame 20 where it is also provided with an inner annular flange 79 also extending into this recess. This casing is provided with openings 80 of sufficient size to permit the free movement of the arms 42 which extends therethrough. Each opening is provided with a flexible closure member 81 secured to the edges about the opening 80, and with its central portion tightly embracing the arm 42, providing a seal for this opening 80, while permitting movement of the plucking element 31. Since this casing 72 rotates with the plate 30 a rotary seal is provided for the free end thereof which will not interfere with the rotation of the casing. This seal may consist of a flat ring plate 82 having a plurality of concentric flanges 83 extending therefrom and of diameters to nest in alternate relation with the enlarged portion 77 and flange 79 of the tubular casing 72. This plate 82 is positioned concentric with the shaft 27 and secured to the bottom surface of the recess 78 in any well known manner such as by screws 84. The foregoing described construction provides a seal which will prevent passage of feathers, etc.

The opening 63 in the upper portion of the front wall 85 of the casing 64 is elongated and of a sufficient size to permit ample time for the cooperating gripping faces of the plucking members to approach each other to grip the feathers of the work as it is urged into the opening. The lower edge 86 of this opening is beveled to a knife edge and the front wall is positioned in extreme close adjacency to the plate 30, which permits the positioning of the fowl to be plucked very close to the plucking members that the pin feathers may be grasped.

In order to reduce to a minimum the wear of the frictionally contacting surfaces of the roller 45 and cam surface 62, I provide a lubricating arrangement which will be relatively long lasting, since these parts are encased and not readily accessible, to furnish a sufficient amount of lubricant to these parts. This lubricating arrangement consists of a receptacle 87 formed of a porous bronze tubular body 88 closed at both ends which provides a chamber 89 which is filled with lubricant. This lubricant filled receptacle 87 is positioned to be contacted by the roller 45 and is secured to a flat resilient support 90 extending from and secured to the plate 30. As the roller 45 is caused to rotate by its connection with the cam it will contact and friction the surface of the lubricant filled receptacle 87 and will carry away and transfer to the cam surface 62 portions of the lubricant oozed through the pores of the wall of the receptacle to keep this surface properly lubricated.

In using the machine just described, the operator will drag the fowl to be plucked on the rotary knife edge 36 of the plucking element which extends slightly above the edge of the opening 63, which action additionally assisted by the action of the exhaust blower 28 separates the feathers from the skin and positions them in the path of the rotating plucking members. As these rotating plucking members near the opening 63 their cooperating gripping surfaces 55 and 56 are approaching under the action of the compression springs 50 which is permitted by the relationship between the cam surface 62 and the rollers 45, and when adjacent to the opening 63 will grip the feathers and the then continued movement of the parts will pull the gripped feathers from the flesh of the fowl. The fowl is held against the surface of the casing which holds the skin back while the feathers are being plucked therefrom to prevent the skin from being unduly raised and torn. As the closed plucking members near the lower part of the machine there will be a relative movement of the plucking elements away from each other caused by the relationship between the cam surface and the rollers to open the jaws against the action of the spring which will release the feathers from the gripping jaws, and under the action of the exhaust blower these freed feathers will be drawn through the conduit 67 to be disposed in an appropriate receptacle not shown.

These plucking elements 39 and 31 will continue to recede from each other until the high point of the cam surface 62 is reached by the roller 45 which will be at a point substantially diametrically opposite to the feather engaging position of the plucking members and from then the plucking elements will start approaching each other to feather gripping position. The approaching and receding of the plucking elements towards and away from each other will be gradual to reduce to a minimum the shock of the periodic closing of the gripping surfaces thereby promoting the efficiency of the operation of the machine.

It will be apparent from the above description that there is a periodic gripping and pulling of the feathers and that the angle of the gripping surfaces of the plucking members are such that the angle of pull is nearly that of the angle which the quills extend from the fowl, that extraction without tearing may be had.

In Figs. 5 to 12 inclusive I have illustrated a modified structure which has spaced side supports 100 secured in position on a base plate 101 by bolts 102 engaging threaded openings 103 provided therein. A slide bearing block 104 having elongated vertically disposed bearing portions 105 and 106 is positioned and secured between these side supports by bolts 107 extending through suitable aligned openings and by nuts 108 engaging the threaded end portions of the bolts.

Slidably mounted on the front bearing portion 105 of the bearing block is a plate 109 the upper portion of which forms one of the gripping elements 110 of the plucking members. This plate 109 is provided with an extension or abutment 111 secured thereto in a suitable manner and against which one end of a compression spring 112 abuts, the opposite end of this spring resting on the bottom of an opening 113 provided in the front portion of the bearing block. This spring urges the plate 109 upwardly and a stop 114 secured to the lower portion thereof and positioned to engage the lower surface of the bearing block 104 limits the upward movement of this plate. The upper edge surface of this plate 109 is beveled and covered with a resilient material such as rubber or the like to provide a resilient gripping surface 115 on this plucking element.

Slidably secured on the rear bearing portion 106 of the bearing block is a slide member 116 having secured on its upper edge surface a horizontally disposed bearing portion 117 on which there is slidably mounted a flat plate 118 provided with a gripping surface 119 similar to gripping surface 115. This slide member 116 and the plate 109 forms the plucking member of this modified machine. The slide member 116 is operatively connected at its lower portion to a crank disk 120 by a link member 121 which is pivotally secured to this slide by stud bolt 122 and to the crank disk by stud bolt 123. A shaft 124 extends from this crank disk 120 and has suitable connection with a source of power, not shown.

In the upper portion of each of the side supports 100 there is provided a recess 125 having angularly and vertically disposed side walls which engage the surface of rollers 126 rotatably mounted on a pin 127 which is welded or otherwise secured on the top surface of the plate 118.

It will now be apparent that the engagement of the rollers 126 with the surfaces of the recess 125 will cause the plate to move angularly towards the front and then vertically upon a downward movement of the slide 116 under the action of the rotation of the crank disk 120.

The plucking member and connected parts are enclosed in a casing 128 which is provided at its upper front portion with a wall 129 inclined at an angle which is substantially that of the angularly disposed side walls of the recess 125. This inclined wall has an opening 130 through which access to the gripping surfaces of the plucking member may be had. An inner closure partition 131 secured to the top surface of the bearing block 104 prevents the free feathers, etc., from lodging between the sliding surfaces and also provides a substantially closed chamber having an opening 132 in one of the side supports 100 by which this chamber may be connected by a suitable conduit, not shown, to a proper exhaust fan, also not shown.

In using this modified machine the operator drags the fowl to be plucked on the knife edge of the now stationary front gripping surface 115 which extends slightly above the edge 132 of the opening 130 and which action separates and positions the feathers, under the additional urge of an exhaust blower, not shown, in the path of the approaching other gripping elements, that the feathers may be gripped between the surfaces 115 and 119 thereof and kept in contact by the upward urge of the spring 112. A further movement of the slide 116 will force the plucking member to move in unison to release or pluck the feathers from the skin. On the upward movement of the slide 116 the plate 109 will also move upwardly under the action of the compression spring. When this slide 116 has reached its uppermost position, this slide 116 will continue its upward movement and on the separation of the jaws the free feathers, etc., will be urged out of the chamber under the action of the exhaust blower, not shown, to be disposed in an appropriate receptacle, also not shown.

The angle at which the gripping surfaces are positioned will release the feathers from the skin at an angle nearly approaching the angle at which the quills extend out of the flesh and stimulate the hand plucking method.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A machine for plucking feathers from a fowl comprising a casing provided with an opening therein, the material surrounding the lower edge of which is beveled inwardly of said casing, a pair of plucking elements in said casing having resilient surfaces beveled inwardly of said casing and adapted to grip and release feathers from a fowl and mounted for movement to and away from said opening, the outer edge of one of said resilient surfaces being positioned in close adjacence to the lower beveled edge of said opening when in feather gripping position, means engaging and relatively moving said plucking members towards each other into feather gripping relationship when adjacent to said opening, means for moving said plucking members in unison away from said opening to release the gripped feathers from a fowl, and means independent of the first mentioned means for moving one of said plucking members toward said opening.

2. A machine for plucking feathers from a fowl comprising a rotatably mounted plate having a gripping surface formed on the outer surface thereof, a cooperating gripping element pivotally mounted on said plate, means for moving said gripping element into feather gripping relationship with the gripping surface on said plate, means for rotating said plate, and means independent of said first mentioned means for returning the gripping element to initial position.

3. A machine for plucking feathers from a fowl comprising a rotatably mounted plate having a gripping surface formed on the outer surface thereof, a cooperating gripping element pivotally mounted on said plate, means for moving said gripping element into feather gripping relationship with the gripping surface on said plate, means for rotating said plate, and cam means for engaging and returning said gripping element to initial position.

4. A machine for plucking feathers from a fowl comprising a rotatably mounted plate having a gripping surface thereon, a plurality of cooperating gripping elements equally spaced and pivotally mounted on said plate, means for moving said gripping elements into feather gripping relationship with said plate, means for rotating said plate, and cam means for engaging and returning said gripping element to initial position.

5. A machine for plucking feathers from a fowl comprising a rotatably mounted plate provided at its outer portion with an inclined resilient surface, a cooperating gripping element pivotally mounted on said plate, means for moving said gripping element towards said inclined surface into feather gripping relationship therewith, means for rotating said plate, and means for engaging and returning said gripping element to initial position.

6. A machine for plucking feathers from a fowl comprising a rotatably mounted plate provided with an inclined yieldable surface at its outer edge thereof, a cooperating gripping element having a yieldable surface and movably mounted on said plate, means for moving said gripping element towards said plate to position said surfaces into feather gripping relationship, and means for rotating said plate.

7. A machine for plucking feathers from a fowl comprising a pair of slidably mounted plucking members provided at their outer portion with inclined resilient surfaces adapted to grip and release feathers from a fowl, means engaging and relatively moving one of said plucking members into feather gripping relationship with the other member and then moving both of said members in unison to pluck the gripped feathers from the fowl, and means independent of the first means for returning one of said plucking members to its initial position.

8. A machine for plucking feathers from a fowl comprising a pair of slidably mounted plucking members adapted to grip and release feathers from a fowl, means engaging and relatively moving one of said plucking members into feather gripping relationship with the other member and then moving both of said members in unison to pluck the gripped feathers from the fowl, and spring means for urging one of said plucking members to its initial position.

9. A machine for plucking feathers from a fowl comprising a pair of slidably mounted plucking members, cam means for moving one of said plucking members into feather gripping relationship with the other member, said other member being positioned to be engaged and moved in one direction by the cam moved member, and means independent of the cam means for moving said second moved member to its initial position.

10. A machine for plucking feathers from a fowl comprising a base, a plucking member slidably mounted on said base, a crank disk, a link connecting said crank disk to said plucking member, a second plucking member movably mounted on said base and positioned to be engaged and moved by said first mentioned plucking member when moved into feather gripping relationship, and means independent of the crank disk for moving said second plucking member into initial position.

11. A machine for plucking feathers from a fowl comprising a base, a slide member slidably mounted on said base, a plucking member movably mounted on said slide member, a crank disk, a link connecting said crank disk to said slide member, a second plucking member movably mounted on said base and positioned to be engaged and moved by said first plucking member when moved into feather gripping relationship, and means independent of the crank disk for moving said second plucking member into initial position.

12. A machine for plucking feathers from a fowl comprising a base, a slide member slidably mounted on said base, a plucking member movably mounted on said slide member, a crank disk, a link connecting said crank disk to said slide member, a second plucking member movably mounted on said base and positioned to be engaged and moved by said first plucking member when moved into feather gripping relationship, and spring means for moving said second plucking member into initial position.

13. A machine for plucking feathers from a fowl comprising a casing, a rotatably mounted disk, plucking elements in said casing mounted on said disk for relative movement, a cam surface, a roller secured to one of said plucking elements and engaging said cam surface for moving said plucking element, and a lubricant container resiliently mounted on said disk and in close adjacency to said roller and movable therewith for lubricating the surface of said roller and cam surface.

14. A machine for plucking feathers from a fowl comprising a casing, a movable support in said casing, a plucking element in said casing mounted on said support for relative movement, a roller secured to said plucking element and a cam surface engageable by said roller for moving said plucking element, and lubricating means resiliently mounted on said support and in engagement with said roller and movable therewith for lubricating said roller and cam surface.

FOSTER FISHER.